United States Patent
Moolsintong et al.

(10) Patent No.: US 7,902,475 B2
(45) Date of Patent: Mar. 8, 2011

(54) FLUSHNESS SHIMS

(75) Inventors: Pinida Jan Moolsintong, St. Louis, MO (US); Douglas J. Weber, Arcadia, CA (US); Stephen P. Zadesky, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1176 days.

(21) Appl. No.: 11/519,284

(22) Filed: Sep. 11, 2006

(65) Prior Publication Data

US 2008/0062153 A1 Mar. 13, 2008

(51) Int. Cl.
*H01H 19/14* (2006.01)

(52) U.S. Cl. ...................................................... 200/564

(58) Field of Classification Search .................. 200/564, 200/600, 521, 296, 11 R, 14, 11 C, 11 G, 200/11 J, 11 K; 345/160, 184, 173, 156
See application file for complete search history.

(56) References Cited

U.S. PATENT DOCUMENTS

| | | | | |
|---|---|---|---|---|
| 5,012,230 A | * | 4/1991 | Yasuda | 345/160 |
| 2005/0052425 A1 | * | 3/2005 | Zadesky et al. | 345/173 |
| 2005/0110755 A1 | * | 5/2005 | Harley et al. | 345/160 |
| 2006/0284836 A1 | * | 12/2006 | Philipp | 345/156 |

* cited by examiner

*Primary Examiner* — Edwin A. Leon
(74) *Attorney, Agent, or Firm* — Kramer Levin Naftalis & Frankel LLP

(57) ABSTRACT

A media player according to the invention is provided. The media player may include a scroll wheel and a housing including a retention ledge. The retention ledge may maintain the position of the scroll wheel with respect to the housing. A flexible printed circuit may also be included in the media player. The flexible printed circuit may include a first face and a second face. The first face may contact the scroll wheel. The second face may include tactile dome switches. Compressible shims may also form a portion of the media player and may be adjacent the second face. The compressible shims may control the distance between the scroll wheel and the retention ledge.

33 Claims, 9 Drawing Sheets

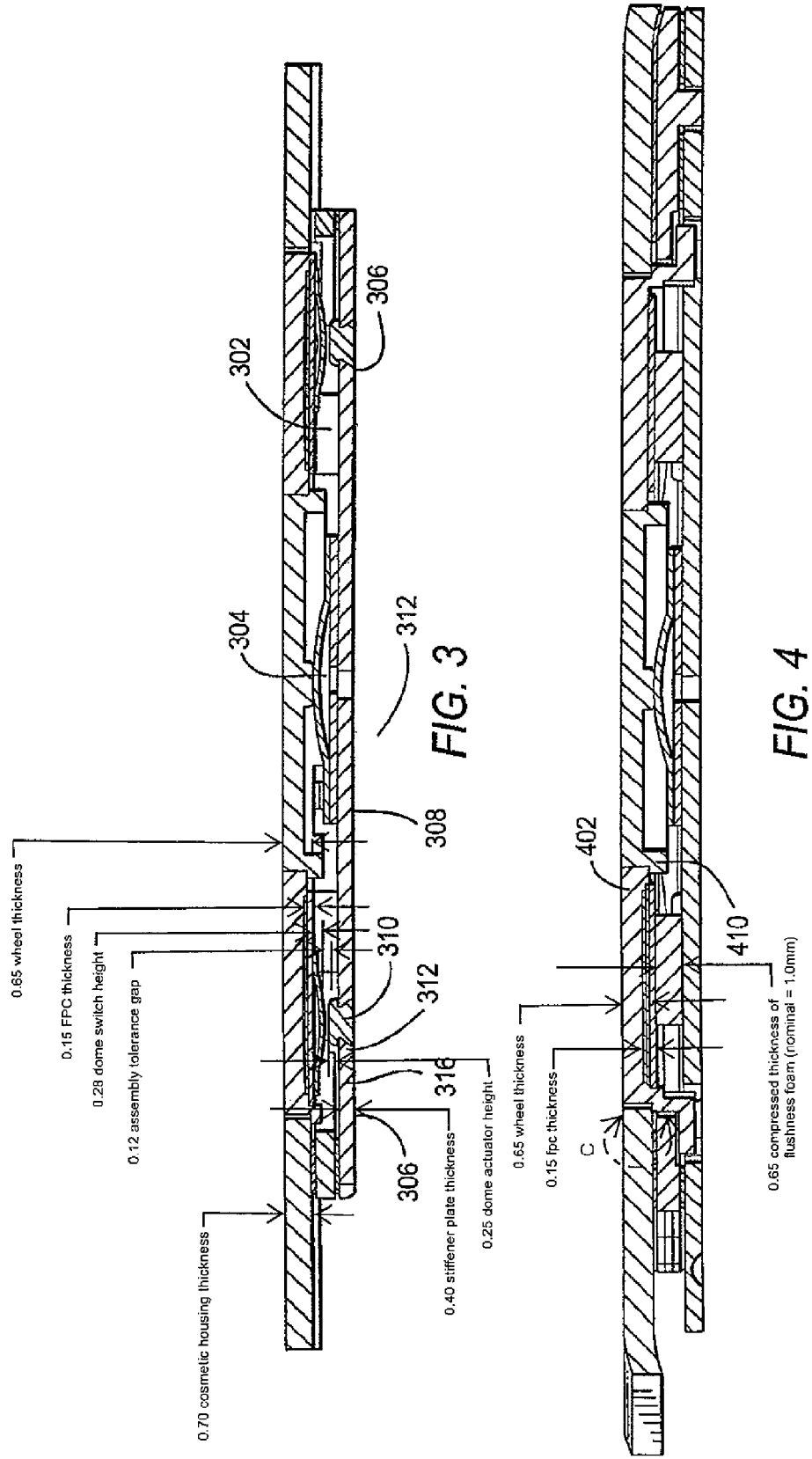

FLUSHNESS SHIMS

BACKGROUND OF THE INVENTION

This invention can relate to apparatus and methods for improving the construction of portable media players. More particularly, this invention can relate to maintaining the effectiveness of construction of portable media players across a range of operational conditions.

BACKGROUND OF THE INVENTION

On many portable electronics with tactile button interfaces, there is a need to have the surface of the button as close to flush as possible with the surface of the housing in which it sits. This is exemplified in the current line of iPod™ products made by Apple Computer Inc., of Cupertino, Calif., which have scroll wheel interfaces. Scroll wheel interfaces permit a user to run a finger around the wheel to navigate through menus. Because dome switches beneath the surface of the wheel can be actuated when pushed intentionally by the user, there is an assembly tolerance gap between the dome switch and its actuator.

As a result of this gap, there can be a small amount of "play" in the fit of the wheel to the housing. This "play" can have a negative impact on the feel of the device. It would therefore be desirable to reduce the gap by having the wheel justified toward the face of the product. It would also be desirable to implement this reduction via a separate mechanism from the dome switches beneath the scroll wheel.

In addition, other product designs may be implemented with a silicone sheet directly behind the wheel and the housing. The silicone sheet can help to keep the two planes flush. However a need exists for a more efficient system for maintaining the two planes substantially, consistently flush.

SUMMARY OF THE INVENTION

One embodiment of the invention can be directed to reducing the tolerance gap to a minimum across a predetermined operational range of the device. The tolerance gap exists because the dome switches cannot be pre-compressed when the device is operational. Thus, the design takes into account the largest nub and the lowest dome to provide a tolerance gap which the device can provide such that the dome switches are not pre-compressed in all manufacturing situations. However, the tolerance gap may result in a certain amount of "play" across the range of operation of the invention. Compressible shims or another suitable device according to the invention preferably provide a force that maintains the tolerance gap at a minimum, or at least at a reduced value, across the predetermined operational range of the device.

A media player according to the invention is provided. The media player may include a scroll wheel and a housing, which has a retention ledge. The retention ledge can accurately position the scroll wheel with respect to the housing. The media player may also include compressible shims that control the distance between the scroll wheel and the retention ledge.

In one embodiment of the invention, the scroll wheel may be implemented to actuate, directly or indirectly, dome switches on a flexible printed circuit. The flexible printed circuit may be under, in contact with, or proximal to, the scroll wheel. In this embodiment, the shims should preferably be implemented so as not to affect the operation of the dome switches.

In another embodiment of the invention, at least one or more springs may be implemented instead, or in combination with, the foam shims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows a cross-section of the scroll wheel 202, button 204, and housing 206 from Line A-A in FIG. 2 according to the invention;

FIG. 4 shows a cross-section of the scroll wheel 202, button 204, and housing 206 from Line B-B in FIG. 2 according to the invention;

DETAILED DESCRIPTION OF THE DISCLOSURE

Figure 1:
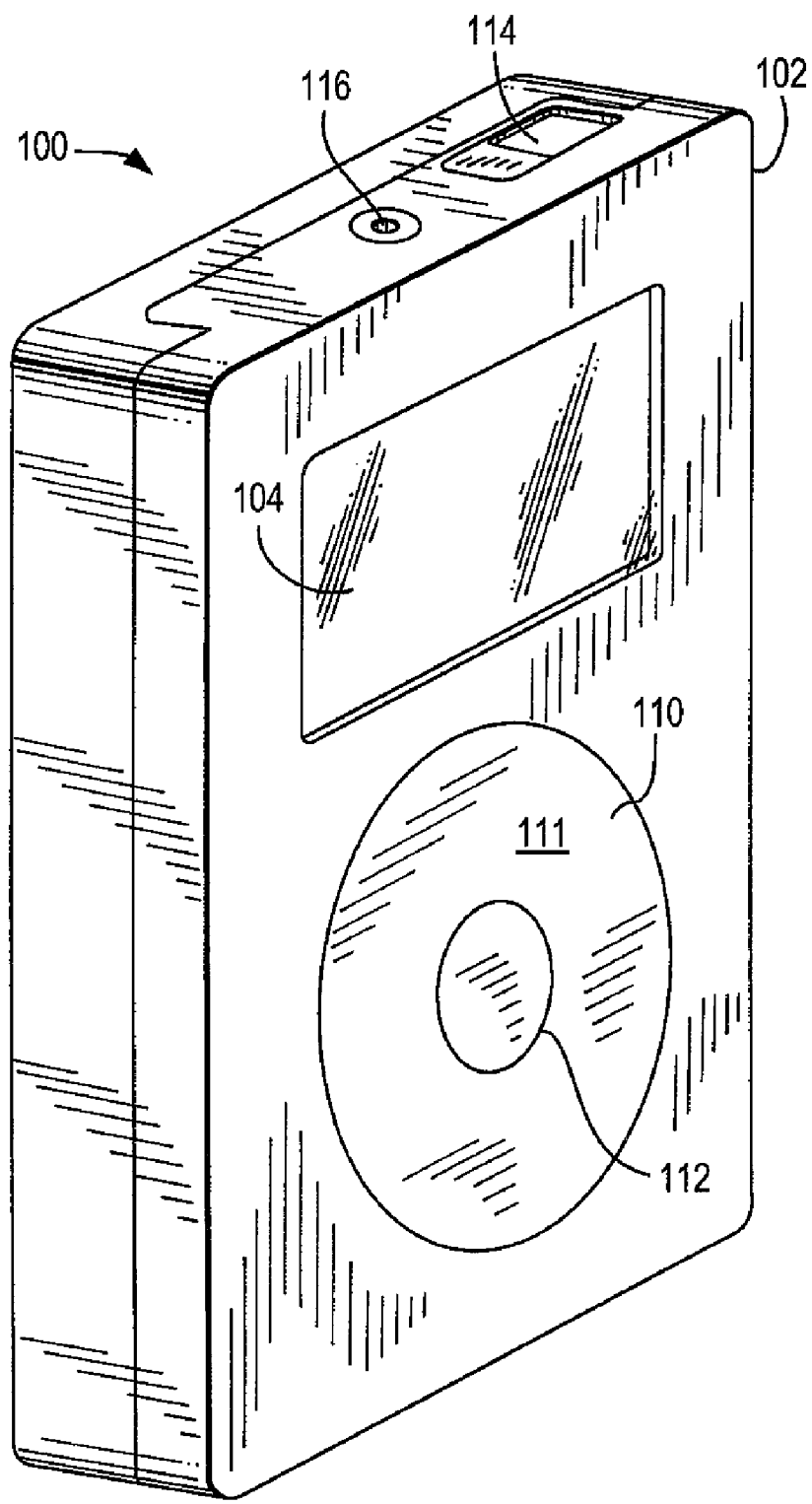
FIG. 1 is a perspective view of a media player, in accordance with one embodiment of the present invention.

The invention can relate to obtaining a substantially coplanar relationship between two surfaces—i.e., a relationship wherein the two surfaces are parallel, within a few degrees, to one another and substantially are part of a single plane—in a media player. In one specific embodiment, the invention may relate to obtaining a substantially coplanar relationship between a scroll wheel in a media player and the housing of the media player. A substantially coplanar relationship may be advantageous to prevent dust from entering the media player and to protect the media player's internal components in other ways, which will be described below.

In one embodiment of the invention, flushness shims, which can be made of a soft foam-like material manufactured by Nitto Denko, of Japan (www.nitto.co.jp), may be placed in such a way as to exert pressure on the scroll wheel. In one embodiment, the foam is soft enough that the foam does not "deaden" the feel of a dome switch when the foam is partially compressed. In one embodiment, the shims can be symmetrically located (e.g., at 45° locations) around the scroll wheel while the dome switches may, in one embodiment, be placed at the 90° locations. In this way, the foam can only partially compress when the dome switch button is actuated. Also the compression of the foam may act to prevent creep over time.

In one embodiment of the invention, the foam can apply pressure from the under side of the wheel to push the face of the wheel flush with the housing. The foam can be in a pre-compressed state to apply the pressure consistently across the operational range of the media player. The foam manufactured by Nitto, for example, is particularly advantageous for this because it can be compressed to 10% of its non-compressed thickness. The Nitto foam is made in many thicknesses, but an about 1.0 millimeter (mm) thickness can be used for the scroll wheel application that can be nominally—i.e., with no user compression of the wheel—compressed to about 0.65 mm. The about 11.0 mm foam could theoretically be compressed down to as little as about about 0.1 mm (10%). When the dome switch is activated, the foam may get compressed down to about 0.4 mm. The minimum 0.4 mm thickness during activation of the dome switch allows the foam to be in substantially constant compression while preventing wear or creep over time.

The Nitto material was originally designed as an LCM (Liquid Crystal Matrix display) gasket for portable electronics. The Nitto foam is known for its shock-absorbing qualities and ability to keep dust out of a display assembly. It is not essential that the material used for the flushness shims according to the invention be the Nitto material. Rather, any suitable foam having suitable mechanical properties may be used according to the invention.

The following physical characteristics are beneficial in certain shims according to the invention. First, the shims should possess an ability to take a pre-compression without creep. In one embodiment, pre-compression can be sufficient to overcome assembly tolerances with respect to the distance between the scroll wheel and the housing surface. In one iPod™ device, for example, the foam should be able to be pre-compressed to about 0.2 mm to overcome possible factory condition within the part specifications.

The shims may also possess the ability to maintain a substantially constant push-back force. The shims can also include a relatively low compressive force so as not to "deaden" the feel of nearby buttons. In other embodiments, a similar effect as the effect created by the foam shims may be created with a large, soft spring that may be concentric with the wheel or center button. This may be a more complex mechanism, but it is conceivable that it could have the same function. Alternatively, in another embodiment of the invention, the effect created by the foam shims may be obtained by using a plurality of springs which may be used to create the same force and action of the foam.

FIG. 1 is a perspective diagram of media player 100, in accordance with one embodiment of the present invention. The term "media player" generally refers to computing devices that are dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player is a hand-held device sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user can use the device while working out at the gym. In case of a camera, a user can use the device while mountain climbing. In the case of a game player, the user can use the device while traveling in a car. Furthermore, the device can be operated by the users' hands; no reference surface such as a desktop is needed. In the illustrated embodiment, media player 100 is a pocket-sized hand-held MP3 music player that allows a user to store a large collection of music. Although used primarily for storing and playing music, the MP3 music player shown herein can also include additional functionality such as storing a calendar and phone lists, storing and playing games, storing photos and the like. In fact, in some cases, it can act as a highly transportable storage device.

Electronic device 10 can also be any miniature consumer electronic device. Miniature electronic devices may have a form factor that is smaller than that of hand-held devices. Illustrative miniature electronic devices can include, but are not limited to, watches, rings, necklaces, belts, accessories for belts, headsets, accessories for shoes, virtual reality devices, other wearable electronics, accessories for sporting equipment, accessories for fitness equipment, or combinations thereof.

By way of example, the MP3 music player can correspond to the iPod™ MP3 player manufactured by Apple Computer of Cupertino, Calif. One pocket-sized IPod™ has a width of about 2.4 inches, a height of about 4 inches and depths ranging from about 0.72 to about 0.84 inches, although any relatively small size is possible.

As shown in FIG. 1, the media player 100 FIG. 1 also shows housing 102, display screen 104, scroll wheel 110, center button 112, holdswitch 114, and earphone jack 116 of media player. Housing 102 can host center button 112, and can in fact be configured to retain scroll wheel 110 in its position in the media player. Navigation can be implemented in the form of transmission of user instructions in response to user stimulus on scroll wheel 110, button 112, etc.

In addition, housing 102 can also define the shape or form of the media player. That is, the contour of housing 102 can embody the outward physical appearance of media player 100. The integrated circuit chips and other circuitry contained within the housing can include a microprocessor (e.g., CPU), memory (e.g., ROM, RAM), a power supply (e.g., battery), a circuit board, a hard drive, other memory (e.g., flash) and/or various input/output (I/O) support circuitry. The electrical components can also include components for inputting or outputting music or sound such as a microphone, amplifier and a digital signal processor (DSP). The electrical components can also include components for capturing images such as image sensors (e.g., charge coupled device (CCD) or complimentary oxide semiconductor (CMOS)) or optics (e.g., lenses, splitters, filters). The electrical components can also include components for sending and receiving media (e.g., antenna, receiver, transmitter, transceiver, etc.).

In the embodiment shown in FIG. 1, the media player 100 includes display screen 104 and related circuitry. Display screen 104 is used to display a graphical user interface as well as other information to the user (e.g., text, objects, graphics). As shown, display screen 104 is visible to a user of media player 100 through opening 105 in housing 102, and through transparent wall 106 disposed in front of opening 105.

As mentioned above, media player 100 also can include scroll wheel 110. Scroll wheel 110 generally consists of touchable outer surface 111 for receiving a finger or other suitable object for manipulation on scroll wheel 110.

The position of display screen 104 and scroll wheel 110 relative to housing 102 can be widely varied. For example, they can be placed at any external surface (e.g., top, side, front, or back) of housing 102 that is accessible to a user during manipulation of media player 100. In the illustrated embodiment, scroll wheel 110 is located in a lower, front area of housing 102.

In addition to the above, media player 100 can also include one or more buttons 112. Button 112 can be configured to provide one or more dedicated control functions for making selections or issuing commands associated with operating media player 100. In most cases, the button functions are implemented via a mechanical clicking action.

Moreover, the media player 100 can also include hold switch 114, a headphone jack 116 and a data port (not shown).

The methods according to the invention can preferably implemented by a combination of hardware and software, but can also be implemented in hardware or software. The method can also be embodied as computer readable code on a computer readable medium. The computer readable medium is any data storage device that can store data which can thereafter be read by a computer system. Examples of the computer readable medium include read-only memory, random-access memory, hard drive, flash memory, CD-ROMs, DVDs, magnetic tape, optical data storage devices, and carrier waves.

Figure 2:
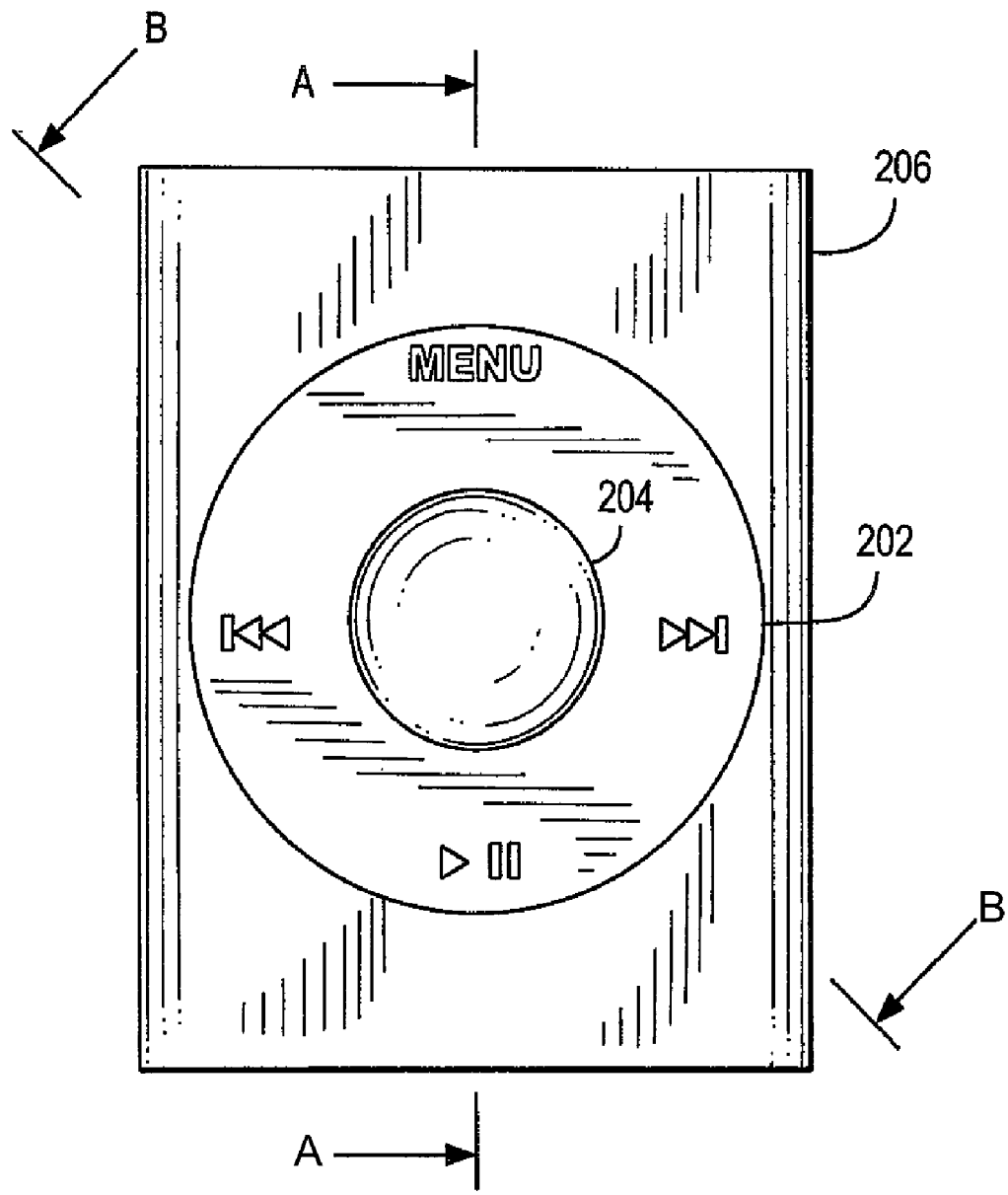
FIG. 2 is a top plan view of scroll wheel 202 and center button 204 of a media player according to the invention.

FIG. 2 shows a top plan view of illustrative scroll wheel 202 and center button 204. FIG. 2 also shows a portion of housing 206. FIG. 2 provides a reference figure for FIGS. 3 and 4 which follow and which show the internal components of the media player shown in FIG. 2.

FIG. 3 shows a cross-section of scroll wheel 202, button 204, and housing 206 from line A-A in FIG. 2. FIG. 3 shows scroll wheel 302, center button 304, dome switch 306, back plate 308, flexible printed circuit board 310, stiffener plate 312, dome actuator 314, and assembly tolerance gap 316.

FIG. 3 also shows a number of exemplary approximate thicknesses according to one embodiment of the invention. The thickness legends have been included in the FIGURE for the sake of clarity. Each of the values shown in FIGS. 3 and 4 are in millimeters (mm). The thicknesses can include (starting from the left and moving towards the right) 0.70 mm for the cosmetic housing thickness, about 0.40 mm for the stiffener plate thickness, about 0.25 mm for the dome actuator height, about 0.12 mm for the assembly tolerance gap which results from the design of how much distance exists from the actuator nubs to the actuator domes in a least tolerant case scenario wherein the nub is as high as product specifications allow and the dome is as low as product specifications allow (if the domes are pre-loaded by the nubs, the switch may be in an ON state even before it is depressed), about 0.28 mm for the dome switch height, about 0.15 mm for the flexible printed circuit (FPC) height, and about 0.65 mm for the scroll wheel thickness. One purpose of pre-compressing the shims is that the pre-compression ensures that the tolerance gap remains consistently at a minimum substantially independent of the operational conditions of the device. In one embodiment of the invention the tolerance gap is transparent to the user.

FIG. 4 shows a side view of a cross-section of scroll wheel 202, button 204, and housing 206 from Line B-B in FIG. 2. FIG. 4 shows in pertinent part flushness shim 401, scroll wheel 402, and FPC 410. The thicknesses shown in FIG. 4 include the thickness of the flushness foam of nominally about 0.65 mm, about 0.15 FPC thickness and about 0.65 wheel thickness.

Figure 5:
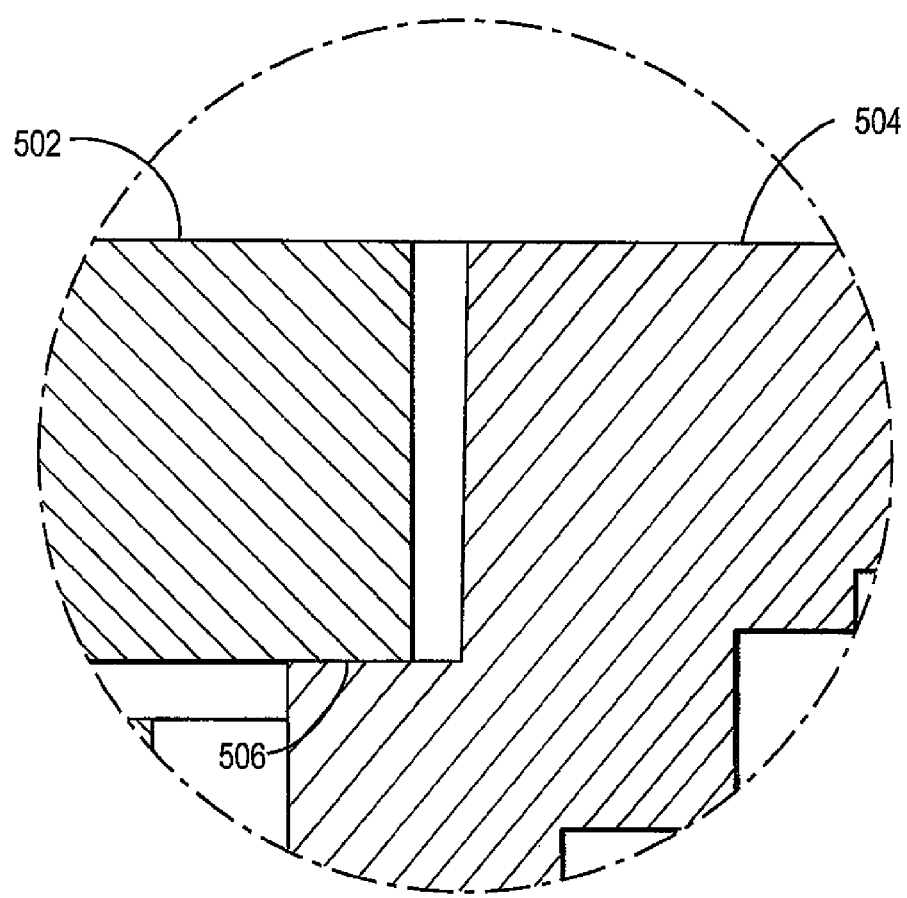
FIG. 5 shows an exploded portion of FIG. 4 taken from curve C in FIG. 4.

FIG. 5 shows an exploded portion of FIG. 4 taken from curve C in FIG. 4. FIG. 5 shows retention ledge of housing surface 502, wheel surface 504 and point of contact 506 between ledge 502 and wheel surface 504. One aspect of the invention can be to maintain the surface of the housing and the surface of the wheel as planar as possible all around the circumference of the wheel across all the operational conditions of the media player.

When the flushness shim is compressed, retention ledge 502 can touch all around the circumference of the scroll wheel. It follows that, in the situation of the flushness shim being compressed, the actual flushness of ledge 502 and the scroll wheel can then be controlled by the manufacturing tolerances of the wheel and the housing. This situation can be an optimal set of conditions for achieving one aforementioned goal of the invention—i.e., to maintain the two surfaces as planar as possible all around the circumference of the wheel across all the operational conditions of the media player.

Figure 6:
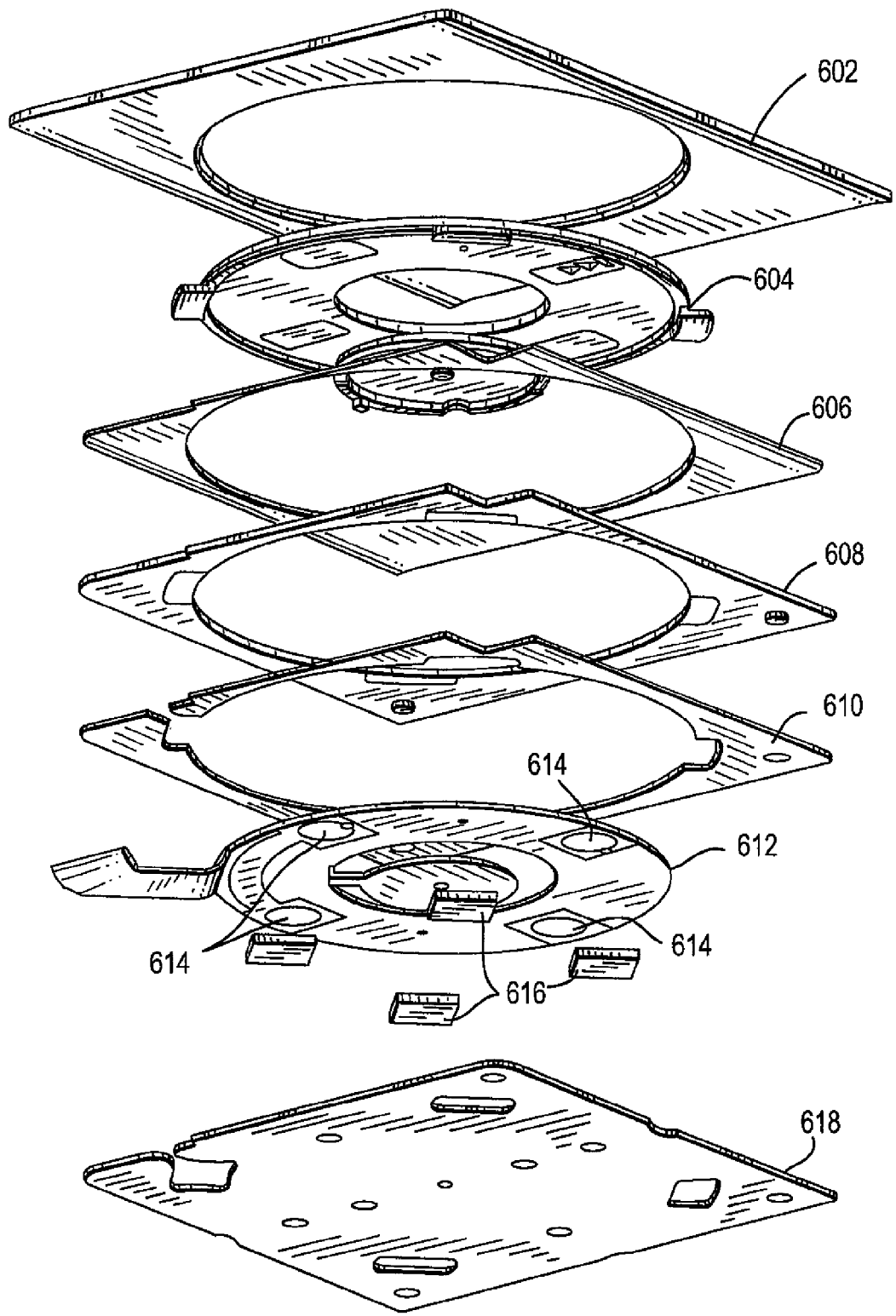
FIG. 6 shows an exploded perspective view from below of the flushness shims and related apparatus according to one embodiment of the invention.

FIG. 6 shows an exploded perspective view from below of the flushness shims and related apparatus according to one embodiment of the invention. FIG. 6 shows housing 602, scroll wheel 604, adhesive 606, retainer 608, adhesive 610, FPC 612, dome switches 614, flushness shim foam pieces 616 and stiffener plate 618.

Figure 7:
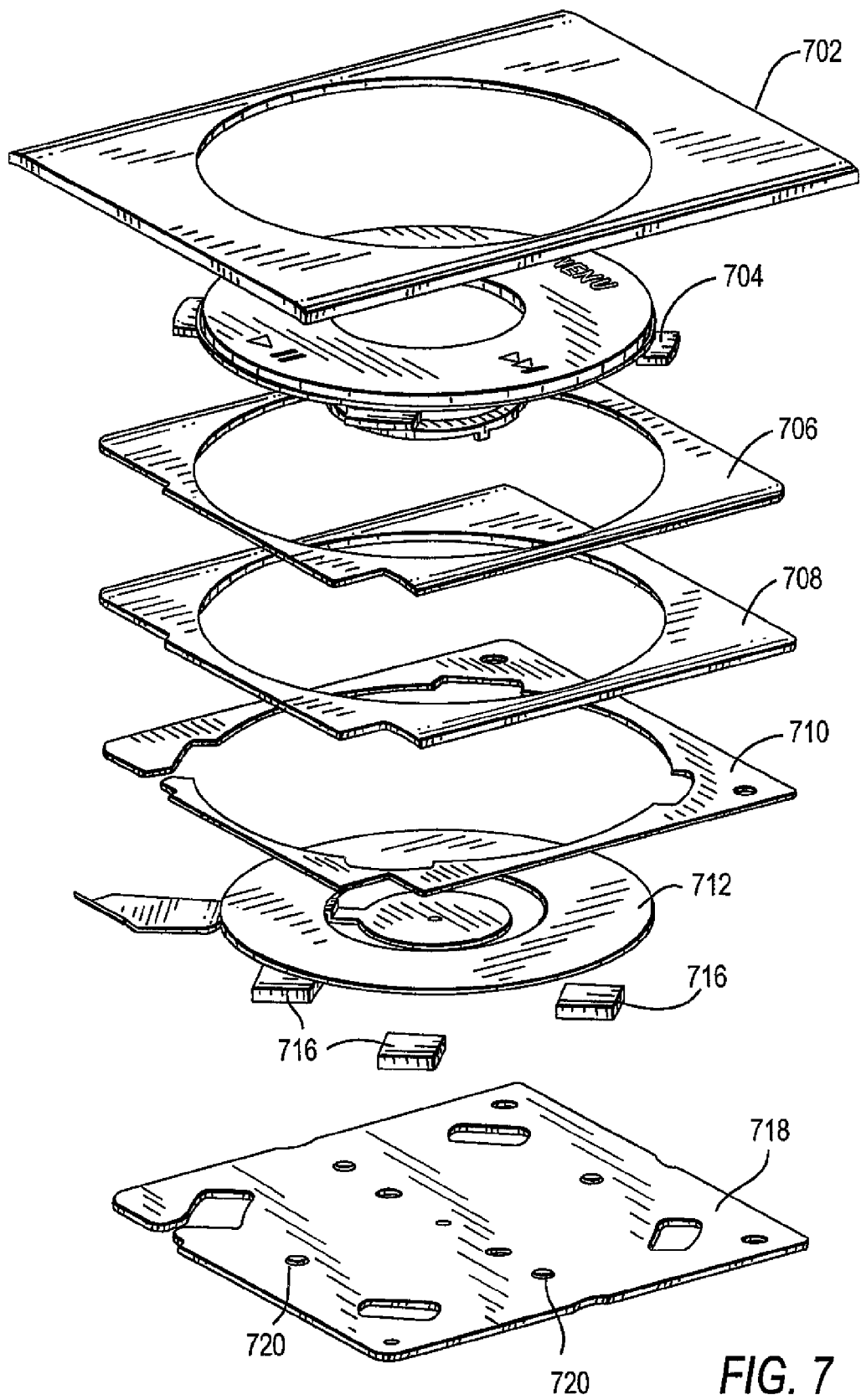
FIG. 7 shows an exploded perspective view from above of the flushness shims and related apparatus according to one embodiment of the invention.

FIG. 7 shows an exploded perspective view from above of the flushness shims and related apparatus according to one embodiment of the invention. FIG. 7 shows housing 702, scroll wheel 704, adhesive 706, retainer 708, adhesive 710, FPC 712 (dome switches not visible from this perspective), flushness shim foam pieces 716 and stiffener plate 718. Stiffener plate 718 also shows dome switch actuator nubs 720.

Figure 8:
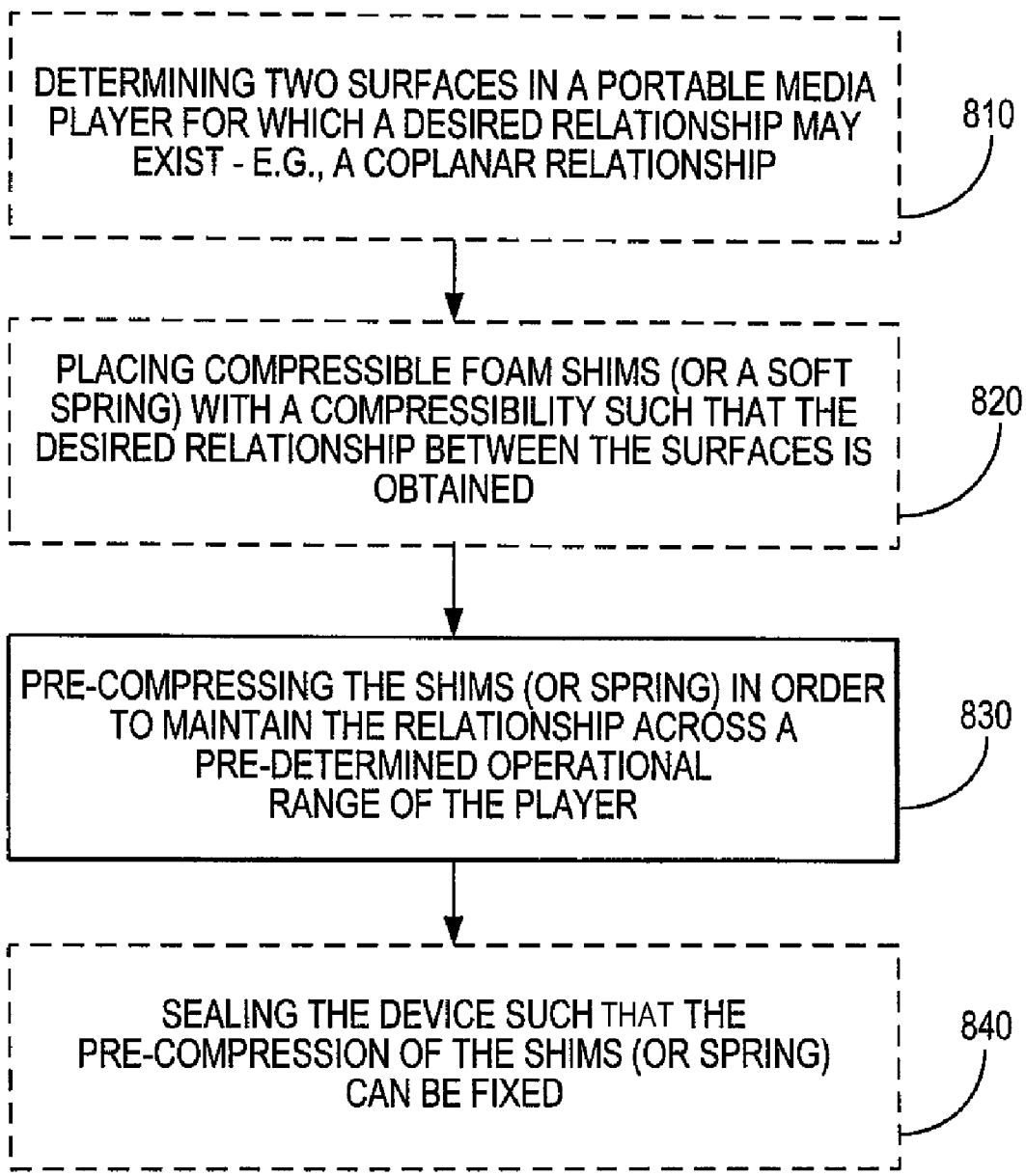
FIG. 8 shows one embodiment of a method according to the invention.

A method according to the invention is shown in FIG. 8. Step 810 shows determining two or more surfaces in a portable media player for which a desired relationship may exist—e.g., a substantially coplanar relationship. Step 820 shows placing compressible foam shims, a soft spring or other suitable apparatus having a compressibility such that the desired relationship between the surfaces is obtained (without compromising the other functions of apparatus associated with the surfaces).

Step 830 shows pre-compressing the shims (or spring) in order to maintain the relationship between the two surfaces across a pre-determined operational range of the player. Step 840 shows sealing the device such that the pre-compression of the shims (or spring) can be fixed. It should be noted that at least steps 810, 820, and 840 include optional components relating to the apparatus for implementation of the invention—i.e., shims, a spring, or other suitable apparatus.

Figure 9:
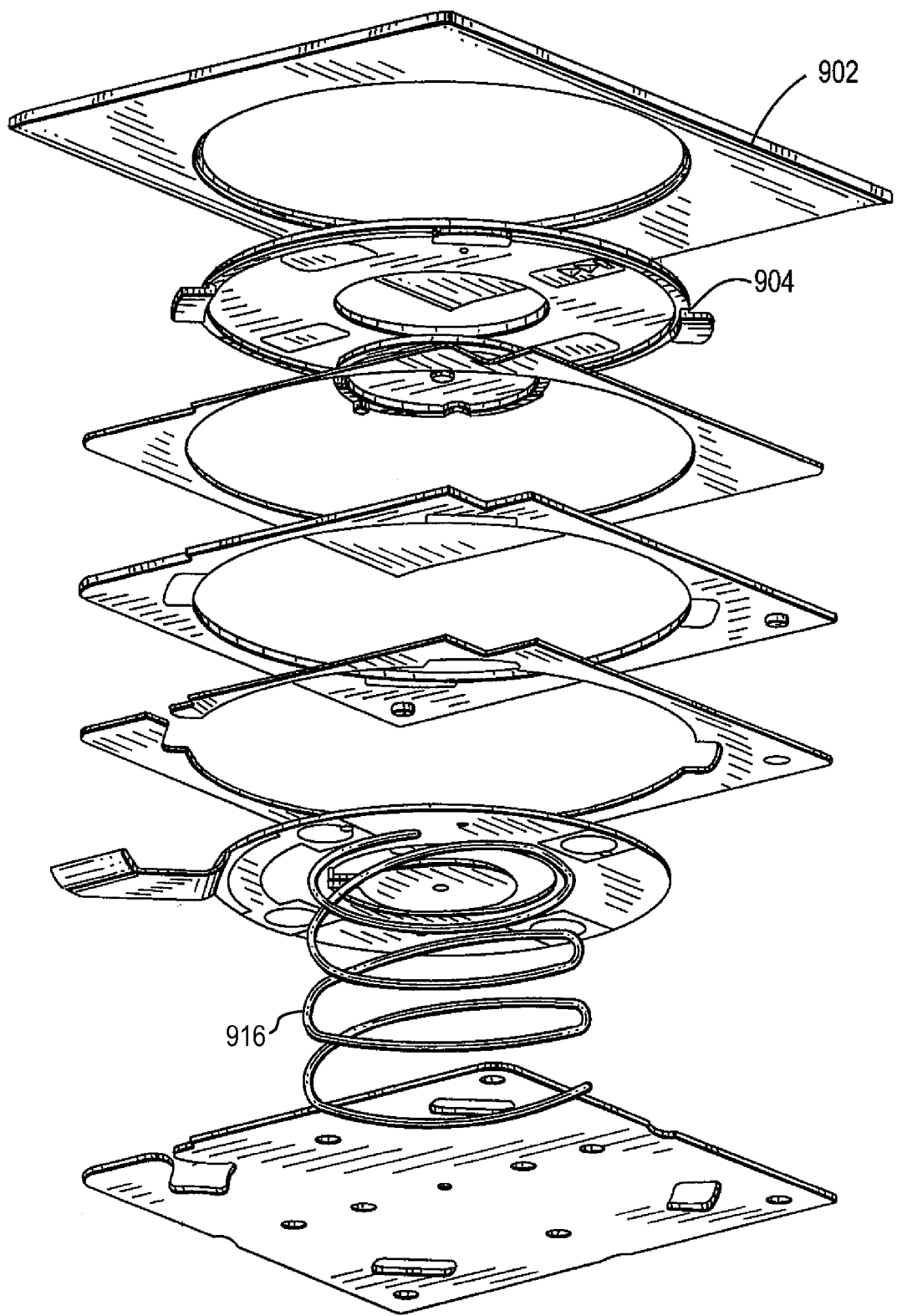
FIG. 9 an exploded perspective view from below of a single spring and related apparatus according to one embodiment of the invention.

FIG. 9 shows one embodiment of the invention having spring 916 implemented as the apparatus for controlling the distance between housing 902 and scroll wheel 904.

Figure 10:
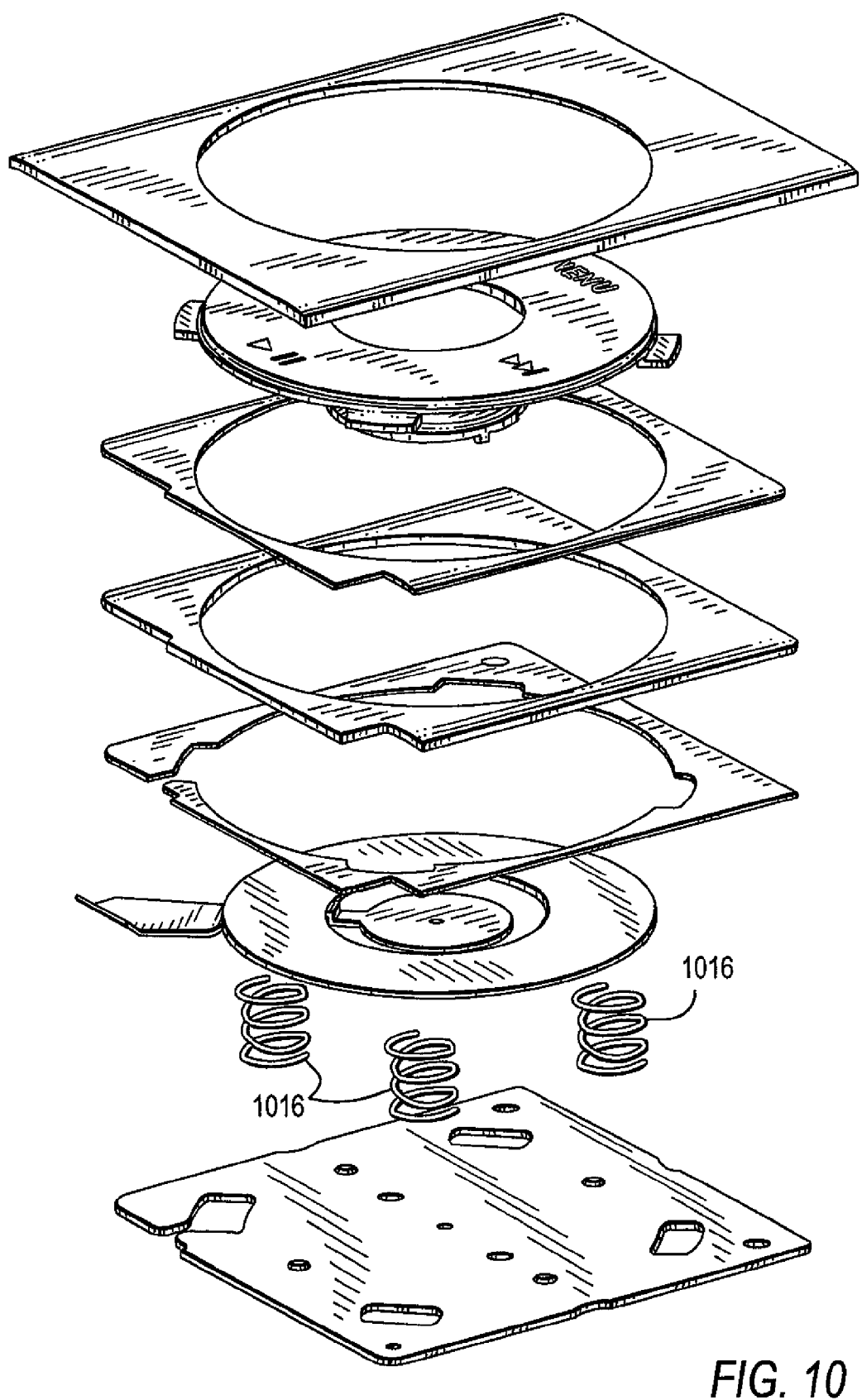
FIG. 10 shows an exploded perspective view from above of a plurality of springs and related apparatus according to another embodiment of the invention.

FIG. 10 shows that a plurality of small springs 1016 may be implemented instead of the single large spring shown in FIG. 9.

The methods according to the invention can preferably implemented by a combination of hardware and software, but can also be implemented in hardware or software. The method can also be embodied as computer readable code on a computer readable medium. The computer readable medium is any data storage device that can store data which can thereafter be read by a computer system. Examples of the computer readable medium include read-only memory, random-access memory, hard drive, flash memory, CD-ROMs, DVDs, magnetic tape, optical data storage devices, and carrier waves.

It is therefore intended that the following appended claims be interpreted as including all such alterations, permutations, and equivalents as fall within the true spirit and scope of the present invention. The embodiments described herein-above are further intended to explain the best modes known of practicing the invention and to enable others skilled in the art to utilize the invention in such, or other embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A portable media player comprising:
   a scroll wheel;
   a housing comprising a retention ledge that maintains the position of the scroll wheel with respect to the housing;
   compressible shims that control the distance between the scroll wheel and the retention ledge; and
   dome switches actuated by movement of the scroll wheel, the dome switches being distinct from the compressible shims.

2. The media player of claim 1 further comprising a flexible printed circuit coupled with the dome switches and adapted to register user movement relative to the scroll wheel.

3. The media player of claim 1 further comprising a flexible printed circuit disposed adjacent the scroll wheel, the shims being disposed adjacent the flexible printed circuit.

4. The media player of claim 1 further comprising a flexible printed circuit disposed under the scroll wheel, the shims being disposed under the flexible printed circuit.

5. The media player of claim 1 further comprising a flexible printed circuit disposed in contact with the scroll wheel, the shims being disposed in contact with the flexible printed circuit.

6. The media player of claim 1 further comprising a flexible printed circuit including one face proximal to the scroll wheel, wherein:
   the dome switches are implemented on a face of the flexible printed circuit distal to the scroll wheel;
   the shims are in contact with the face of the flexible printed circuit distal to the scroll wheel; and
   the shims are spaced apart from the dome switches.

7. The media player of claim 1, wherein the compressible shims maintain a substantially constant push-back force.

8. The media player of claim 1, wherein the retention ledge touches all around a circumference of the scroll wheel when the compressible shims are compressed beyond a nominal level of compression.

9. The media player of claim 1 wherein the compressible shims are compressed to at least a nominal level of compression at all times.

10. The media player of claim 9, wherein the nominal level of compression ensures that a tolerance gap adjacent to the dome switches is independent of operational conditions of the media player.

11. A portable media player comprising:
    a scroll wheel;
    a housing comprising a retention ledge that maintains the position of the scroll wheel with respect to the housing;
    a flexible printed circuit having a first face and a second face, the first face contacting the scroll wheel and the second face comprising tactile dome switches; and
    compressible shims adjacent the second face and distinct from the tactile dome switches, wherein the compressible shims control the distance between the scroll wheel and the retention ledge.

12. The media player of claim 11, wherein the flexible printed circuit is adapted to register user movement relative to the scroll wheel.

13. The media player of claim 11, wherein:
    the flexible printed circuit is disposed under the scroll wheel with respect to a surface of the housing with which the scroll wheel is substantially contiguous; and
    the shims are disposed under the flexible printed circuit with respect to the surface of the housing with which the scroll wheel is substantially contiguous.

14. The media player of claim 11, wherein:
    the flexible printed circuit is in contact with the scroll wheel; and
    the shims are in contact with the flexible printed circuit.

15. The media player of claim 11, wherein the shims are spaced apart from the dome switches by at least a pre-determined distance.

16. The media player of claim 11, wherein the shims are spaced apart from the dome switches by at least a pre-determined angle.

17. The media player of claim 11 wherein the retention ledge is in contact with the scroll wheel.

18. The media player of claim 11, wherein the compressible shims maintain a substantially constant push-back force.

19. The media player of claim 11, wherein the retention ledge touches all around a circumference of the scroll wheel when the compressible shims are compressed beyond a nominal level of compression.

20. The media player of claim 11, wherein the compressible shims are compressed to at least a nominal level of compression at all times.

21. The media player of claim 20, wherein the nominal level of compression ensures that a tolerance gap adjacent to the dome switches is independent of operational conditions of the media player.

22. A media player comprising:
    a scroll wheel comprising an outer surface;
    a housing comprising an outer surface and a retention ledge that maintains the position of the scroll wheel with respect to the housing;
    a flexible printed circuit adjacent the scroll wheel and comprising tactile dome switches; and
    compressible shims adjacent the flexible printed circuit and distinct from the tactile dome switches, wherein the compressible shims maintain the outer surface of the scroll wheel in a substantially coplanar relationship with the outer surface of the housing unless the scroll wheel is activated.

23. The media player of claim 22, wherein the flexible printed circuit is adapted to register user movement relative to the scroll wheel.

24. The media player of claim 22, wherein:
    the flexible printed circuit is disposed under the scroll wheel with respect to the outer surface of the housing; and
    the compressible shims are disposed under the flexible printed circuit with respect to the outer surface of the housing.

25. The media player of claim 22, wherein:
    the flexible printed circuit is in contact with the scroll wheel; and
    the compressible shims are in contact with the flexible printed circuit.

26. The media player of claim 22, wherein the compressible shims are spaced apart from the dome switches by at least a pre-determined distance.

27. The media player of claim 22, wherein the compressible shims are spaced apart from the dome switches by at least a pre-determined angle.

28. The media player of claim 22, wherein the retention ledge is in contact with the scroll wheel.

29. The media player of claim 22, wherein the compressible shims maintain a substantially constant push-back force.

30. The media player of claim 22, wherein the retention ledge touches all around a circumference of the scroll wheel when the compressible shims are compressed beyond a nominal level of compression.

31. The media player of claim 22, wherein the compressible shims are compressed to at least a nominal level of compression at all times.

32. The media player of claim 31, wherein the nominal level of compression ensures that a tolerance gap adjacent to the dome switches is independent of operational conditions of the media player.

33. A media player comprising:
a scroll wheel comprising an outer surface;
a housing comprising an outer surface and a retention ledge that maintains the position of the scroll wheel with respect to the housing;
a flexible printed circuit adjacent the scroll wheel and comprising tactile dome switches; and
compressible shims adjacent the flexible printed circuit and distinct from the tactile dome switches, wherein the compressible shims apply pressure that pushes the scroll wheel so that the outer surface of the scroll wheel is flush with the outer surface of the housing unless the scroll wheel is activated.

* * * * *

UNITED STATES PATENT AND TRADEMARK OFFICE
CERTIFICATE OF CORRECTION

| | | |
|---|---|---|
| PATENT NO. | : 7,902,475 B2 | Page 1 of 1 |
| APPLICATION NO. | : 11/519284 | |
| DATED | : March 8, 2011 | |
| INVENTOR(S) | : Pinida Jan Moolsintong et al. | |

It is certified that error appears in the above-identified patent and that said Letters Patent is hereby corrected as shown below:

In column 3, line 8, delete "11.0 mm" and insert -- 1.0 mm --, therefor.

In column 3, line 9, delete "about about" and insert -- about --, therefor.

Signed and Sealed this
Twenty-ninth Day of November, 2011

David J. Kappos
*Director of the United States Patent and Trademark Office*